Dec. 22, 1925.

C. S. COORDES

TIRE CHAIN SIDE LINK

Filed July 24, 1925

Inventor
Cordie S Coordes

Patented Dec. 22, 1925.

1,566,581

UNITED STATES PATENT OFFICE.

CORDIE S. COORDES, OF HARTLEY, IOWA.

TIRE-CHAIN SIDE LINK.

Application filed July 24, 1925. Serial No. 45,746.

*To all whom it may concern:*

Be it known that I, CORDIE S. COORDES, a citizen of the United States, and a resident of Hartley, in the county of O'Brien and State of Iowa, have invented certain new and useful Improvements in a Tire-Chain Side Link, of which the following is a specification.

My invention relates to a tire chain side link of that type which has generally a T-shape, with one point of attachment for the cross links of the chain, and two points of attachment for the side links of the chain.

Such a side link is shown and illustrated in the patent to M. J. Frambach, No. 1,439,303, issued December 19, 1922, under which patent I am a joint licensee, and it is the object of the present invention to provide a link which is an improvement over such a side link.

A further object of my invention is to provide such a side link which is of simple, durable and inexpensive construction.

More particularly, it is my aim to provide such a side link which will not become distorted or give under the stresses imposed upon the link when the chain is in use, and in which the stresses transmitted to the connecting loops of the link will be borne by elements of the links which are disposed substantially in the direct lines of strain imposed upon the link by such stresses.

A further object is to provide a link which is extremely simple of manufacture in addition to accomplishing the foregoing objects.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

The tire chain of which the present improved link forms a part is of a special construction now in general use, which is so designed that the cross chains thereof will grasp the tread of the tire more effectively and be tightened thereagainst by any tendency of the said chains to slip upon the tire in the direction opposed to that of the rotation of the wheel, due to the resistance of the roadway to the rotation of the chains with the tire.

Figure 1:
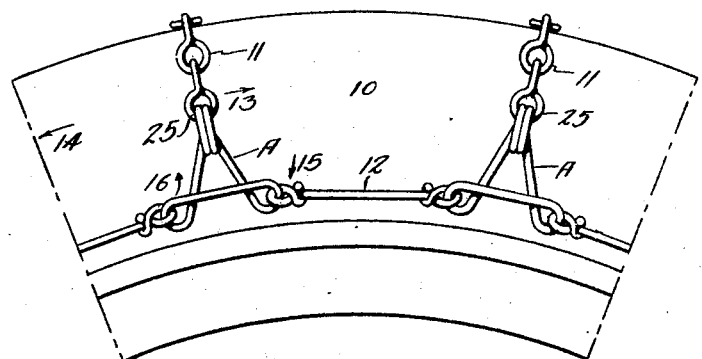
Fig. 1 is a side elevation of a portion of a tire having a chain installed thereon embodying, as a part of its construction, my improved link.

Such a chain is shown in Fig. 1, installed upon a tire, 10, and comprises generally the cross chains, 11, and the side chains which are formed of alternate links, 12, and the side link, A, which embodies the present invention.

The side link, A, has three points of attachment—one for the cross chains, 11, and two for the side connecting links, 12, which are spaced from each other so as to give the link generally the shape of a triangle. As a result, any slipping tendency of the side chains, 10, in the direction indicated by the arrow, 13, opposite to the direction of rotation of the tire, 10, as indicated by the arrow, 14, will move the apex of the triangle embodied in the link to the side, draw one of the base corners of the triangle downwardly, as indicated by the arrow, 15, and the other upwardly, as indicated by the arrow, 16. Consequently the distance between the two base corners of the triangle in a direction circumferentially of the tire will be lessened, as will the mean distance between the two base corners of the triangle, and the apex thereof in a direction laterally of the tire. Consequently it will be seen that the cross chain, 11, will be drawn down against the tire and tightened thereagainst and simultaneously the connecting links, 12, will be tightened against the sides of the tire.

Such a chain is an improvement over original styles of tire chains in that it holds to the tire better, and the likelihood of its being lost is very materially decreased. Further, it clings to the tire so that rapid rotation thereof will not cause it to slap the pavement or ground in the manner that original types did.

Such a chain, however, does not constitute the present invention, the side link being improved so as to obtain further advantages, which I will hereinafter more fully set forth.

One disadvantage of some side links used in the type of tire chain under consideration has been a tendency for the links to spread and give, and thus to partially defeat the object which they were designed to accomplish. The present link aims to overcome such objections.

Figure 2:
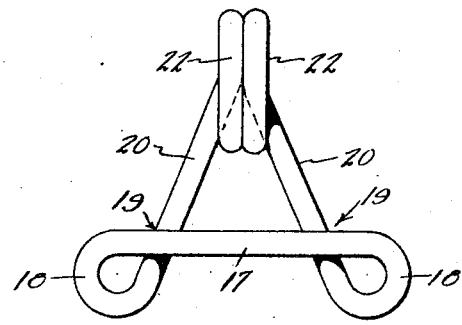
Fig. 2 is a side elevation of the side link.

It comprises a length of stout rod or wire, the central portion of which constitutes an intermediate link portion, 17, which is substantially straight. The outer portions of this length of wire are bent through arcs of substantially 250 degrees so as to form the side chain loops, 18, which, when the link is assembled in a completed tire chain, are closed by the crossing of the wire, as at 19. (See Figs. 2 and 3.)

Being bent through arcs of substantially 250 degrees, the outer portions of the wire are thence extended straight tangentially from the loops, 18, to form the cross chain arms, 20, which converge toward each other and meet at a point disposed at a distance from the intermediate portion, 17, on the other side from the loops, 18. Such point is indicated at 21 in Fig. 3.

The ends of the wire are then looped away from the plane of the arms, 20, substantially perpendicular thereto to form the cross chain loops, 22. The ends of the loops, 22, when the link is assembled in a tire chain, are received between the arms, 20, as at 23 in Fig. 3.

From the point, 21, to the ends of the loops, the loops, 22, are in engagement with each other, side by side, and the ends thereof, when received between the arms, 20, are engaged against the inner sides of said arms.

When pressure is brought to bear against the loop in the direction indicated by the arrow, 24, the result is a tendency of the ends of the loop to wedge between the arms, 20, which are held together by the loop, 25, of the cross chain link, 11, and the tendency of the loops to spread is thus resisted.

Figure 3:
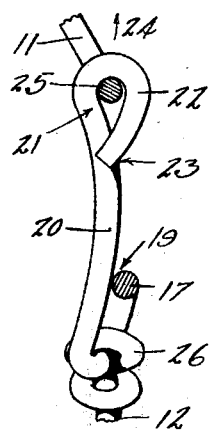
Fig. 3 is a longitudinal central sectional view through the link attached to the other portions of the tire chain.

It will now be seen that the portions, 17 and 20, being disposed in straight lines forming a triangle, will transmit stresses between the loops, 18 and 22, and between the loops, 18, without distortion. However, a slight curvature, as shown in Figs. 3 and 4, may be given to the arms, 20, so as to more readily fit the sides of the tire without affecting this function of the link.

By simply bending the ends of the intermediate portion in a single closed loop and thence bending the arms, 20, straight, the simplest method of manufacture is obtained and a link is provided which will not give under any of the stresses to which it is subjected.

Figure 4:
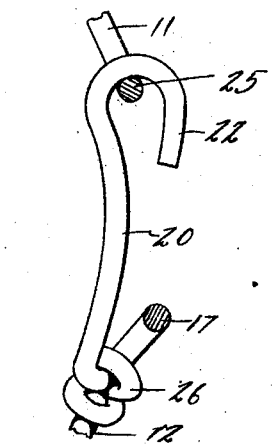
Fig. 4 is a similar sectional view, the loops of the link being shown open in the position occupied during the assembling process.

Referring now to the manufacture of the link and the chain in which it is embodied, the loops, 18 and 22, are first formed open, as shown in Fig. 4. The loops, 18, may be formed by first bending the arms, 20, into a general triangular form having a base, 17, and rounded corners, and then turning the base back upon the arms, 20, to form the loops, 18. Enough space is left between the intermediate portion, 17, and the arms, 20, in the original form of the link so that the end loops, 26, of the connecting loops, 12, may be slipped down over the arms, 20, and between the arms, 20, and intermediate portions, 17, into the loops, 18.

The cross chains, 11, are then hooked into the open loops, 22, and the whole combination inserted between the flat jaws of a press, which are brought together against the loops so as to mash them down into place.

The original forming of the loop is done in a suitable die, and it will be seen that this assembling process is rendered very simple by a single stroke of the press for each link.

In some old styles of such links there has been a tendency for the side chain connecting portions or loops to open up and allow the links, 12, to slide out of position and thus tangle the links of the chain. This can not happen under any circumstances where the present link is employed.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tire chain side link to be used in a tire having cross chains and side chains, said link comprising an intermediate portion adapted to lie longitudinally of the side chains and to form a part thereof, a closed side chain loop at either extremity of the intermediate portion, for the reception of side chain connecting links, cross chain arms forming continuations of said side chain loops and converging together laterally of the intermediate portion, and cross chain loops formed at the ends of said cross chain arms, the side link having generally the shape of a triangle with the loops at the vertices thereof and the cross chain arms and intermediate portion forming sides thereof and disposed substantially in the direct lines of strain between the loops when the link is subjected to diverging stresses applied to said loops.

2. A tire chain side link to be used in a tire having cross chains and side chains, said link comprising an intermediate portion adapted to lie longitudinally of the side chains and to form a part thereof, a closed side chain loop at either extremity of the intermediate portion, for the reception of side chain connecting links, cross chain arms forming continuations of said side chain loops and converging together laterally of the intermediate portion, and cross chain loops formed at the ends of said cross chain arms, the side link having generally the shape of a triangle with the loops at the vertices thereof and the cross chain arms and intermediate portion forming sides thereof and disposed substantially in the direct lines of strain between the loops when the link is subjected to diverging stresses applied to said loops, the cross chain loops being disposed in planes substantially perpendicular to the general plane of the side link, and the ends thereof being received between the cross chain arms.

3. A tire chain side link to be used in a tire having cross chains and side chains, said link comprising an intermediate portion adapted to lie longitudinally of the side chains and to form a part thereof, portions bent back upon and across said intermediate portion to form single closed side chain loops and cross chain arms converging together, on the other side of the intermediate portion from the side chain loops, and thence bent back upon themselves in planes substantially perpendicular to that of the link to form cross chain loops, the ends of the cross chain loops being received between the cross chain arms, the side link having generally the shape of a triangle with the loops at the vertices thereof and the cross chain arms and intermediate portion forming sides thereof and disposed substantially in the direct lines of strain between the loops when the link is subjected to diverging stresses applied to said loops.

4. A tire chain side link to be used in a tire having cross chains and side chains, said link being formed of a length of link material having a substantially straight intermediate portion, said material being bent at either extremity of said intermediate portion to form closed loops, tangential of said intermediate portion, and thence extended tangentially of said loops to a common point spaced laterally from the center of the intermediate portion, to form cross chain arms, the ends of said material being thence looped to form cross chain loops, said loops being disposed substantially perpendicularly to the plane of the cross chain arms, and side by side.

Signed at Hartley, in the county of O'Brien and State of Iowa, this 14th day of July, 1925.

CORDIE S. COORDES.